United States Patent [19]

Schimmel et al.

[11] Patent Number: 5,268,156
[45] Date of Patent: Dec. 7, 1993

[54] PROCESS FOR THE PREPARATION OF SODIUM SILICATES

[75] Inventors: Günther Schimmel; Michael Kotzian, both of Erftstadt; Alexander Tapper, Mönchengladbach; Gerd Wingefeld, Hofheim, all of Fed. Rep. of Germany

[73] Assignee: Hoechst Aktiengesellschaft, Frankfurt am Main, Fed. Rep. of Germany

[21] Appl. No.: 839,935

[22] Filed: Feb. 21, 1992

[30] Foreign Application Priority Data

Mar. 7, 1991 [DE] Fed. Rep. of Germany ....... 4107230

[51] Int. Cl.$^5$ ............................................. C01B 33/24
[52] U.S. Cl. ................................... 423/334; 423/332; 423/333
[58] Field of Search ...................... 423/332, 333, 334

[56] References Cited

U.S. PATENT DOCUMENTS

| | | | |
|---|---|---|---|
| 3,835,216 | 9/1974 | Almagro et al. | 423/332 |
| 3,879,527 | 4/1975 | Bertorelli et al. | 423/332 |
| 3,912,649 | 10/1975 | Bertorelli et al. | 252/135 |
| 4,578,258 | 3/1986 | Rieck | 423/332 |
| 4,585,642 | 4/1986 | Rieck | 423/332 |
| 4,676,953 | 6/1987 | Jeromin et al. | 422/106 |
| 4,770,866 | 9/1988 | Christophliemk et al. | 423/332 |
| 4,950,310 | 8/1990 | Rieck et al. | 423/332 |

FOREIGN PATENT DOCUMENTS

| | | |
|---|---|---|
| 0170040 | 6/1984 | European Pat. Off. . |
| 0293640 | 6/1987 | European Pat. Off. . |
| 0425428 | 2/1990 | European Pat. Off. . |
| 4031848 | 5/1991 | Fed. Rep. of Germany . |
| 2157943 | 10/1972 | France . |

Primary Examiner—R. Bruce Breneman
Attorney, Agent, or Firm—Connolly & Hutz

[57] ABSTRACT

To prepare crystalline sodium silicates having a laminated structure, a molar ratio of $SiO_2$ to $Na_2O$ of (1.9 to 2.1) 1 and a water content of less than 0.3% by weight from a water glass solution which has a solids content of at least 20% by weight and is obtained by reaction of sand with sodium hydroxide solution in a molar ratio of $SiO_2 : Na_2O$ of (2.0 to 2.3) : 1, the water glass solution is treated with hot air of 200° to 300° C. in a spray drying zone to form a pulverulent, amorphous sodium silicate having a water content (determined as the loss on ignition at 700° C.) of 15 to 23% by weight. The pulverulent, amorphous, water-containing sodium silicate is first ground, preferably to particle sizes of 1 to 50 μm, before it is introduced into an inclined rotary tubular oven and treated in this in countercurrent with flue gas at temperatures of more than 500° to 850° C. to form crystalline sodium silicate. The sodium silicate issuing from the rotary tubular oven is first comminuted to particle sizes of 0.1 to 12 mm and finally ground to particle sizes of 2 to 400 μm.

1 Claim, No Drawings

PROCESS FOR THE PREPARATION OF SODIUM SILICATES

The present invention relates to a process for the preparation of crystalline sodium silicates having a laminated structure, a molar ratio of $SiO_2$ to $Na_2O$ of (1.9 to 2.1 : 1 and a water content of less than 0.3% by weight from a water glass solution having a solids content of at least 20% by weight and is obtained by reaction of sand with sodium hydroxide solution in a molar ratio of $SiO_2$ : $Na_2O$ of (2.0 to 2.3) : 1, by spray drying the water glass solution with hot air of 200° to 300° C. to form a pulverulent, amorphous sodium silicate having a water content (determined as the loss on ignition at 700° C.) of 15 to 23% by weight, treatment of the pulverulent, amorphous, water-containing sodium silicate, which has been introduced into an inclined rotary tubular oven, in countercurrent with flue gas at temperatures of more than 500° to 850° C. to form crystalline sodium silicate, comminution of the sodium silicate issuing from the rotary tubular oven to particle sizes of 0.1 to 12 mm and subsequent grinding to particle sizes of 2 to 400 μm.

A process for the preparation of crystalline sodium silicates having a laminated structure from a water glass solution is known from the previously unpublished German Patent Application P 40 31 848.6. In this process, the water glass solution obtained by reaction of quartz sand with sodium hydroxide solution in a molar ratio of $SiO_2$ to $Na_2O$ of (2.0 to 2.3) : 1 is treated in a spray drying zone with hot air of 200° to 300° C. to form a pulverulent, amorphous sodium silicate having a water content (determined as the loss on ignition at 700° C.) of 15 to 23% by weight. This amorphous sodium silicate is introduced into an inclined rotary tubular oven and treated in this with flue gas at temperatures of more than 500° to 850° C. to form crystalline sodium silicate. The sodium silicate issuing from the rotary tubular oven is comminuted to particle sizes of 0.1 to 12 mm and finally ground to particle sizes of 2 to 400 μm.

The disadvantage of this process is that the spray-dried amorphous sodium silicate forms an extremely lightweight dust when introduced into the rotary tubular oven because of its hollow spherical structure, which means, in addition to heavy contamination of the waste gas filter, the rotary tubular oven is over-filled, and because the transportation of matter in the rotary tubular oven is thereby impeded, the capacity of the oven is reduced.

The disadvantages mentioned are overcome according to the invention by grinding the spray-dried, pulverulent, amorphous sodium silicate before it is introduced into the rotary tubular oven.

The process according to the invention can also additionally be carried out such that the material is ground to particle sizes of 1 to 50 μm. Grinding can be carried out with the aid of any type of mill which is capable of providing the required particle fineness.

In the process according to the invention, the waste gas flowing out of the rotary tubular oven has only a low dust content.

A higher degree of filling in the rotary tubular oven is possible in the process according to the invention, which means that the capacity of the rotary tubular oven is increased.

In the process according to the invention, practically no material sticks to the internal wall of the rotary tubular oven, which results in an improvement in the quality of the sodium silicate issuing from the rotary tubular oven.

The lime-binding capacity of the resulting sodium silicates having a laminated structure referred to in the following examples was determined in accordance with the following instructions:

$CaCl_2$ solution (corresponding to 300 mg of CaO) was added to 1 l of distilled water, water of 30° d being obtained.

1 g of the crystalline sodium silicate obtained in the examples and 0 to 6 ml of a 1 molar glycocoll solution (obtained from 75.1 g of glycocoll and 58.4 g of NaCl, which were dissolved with water to give 1 l) were added to 1 l of this water, which was temperature-controlled at 20° C., after which a pH of 10.4 was established. The suspension was stirred at 20° C. for 30 minutes, during which the pH remained stable. Finally, the solid was filtered off and the calcium which remained in solution in the filtrate was determined complexometrically. The lime-binding capacity was determined by obtaining the difference from the original content.

EXAMPLE 1 (Comparison Example)

Sand (99% by weight of $SiO_2$; particle size: 90% <0.5 mm) and 50% strength by weight sodium hydroxide solution were introduced in a molar ratio of $SiO_2$ to $Na_2O$ of 2.15 : 1 into a nickel-lined, cylindrical autoclave with a stirring device. The mixture was heated to 200° C. in the stirred autoclave by forcing in steam (16 bar) and kept at this temperature for 60 minutes. The contents of the autoclave were then let down into a container via a devolatilization vessel and, after addition of 0.3 % by weight of perlite as a filtering auxiliary at 90° C., were filtered over a disk pressure filter to separate off the insoluble material. A clear water glass solution having a molar ratio of $SiO_2$ to $Na_2O$ of 2.04 : 1 was obtained as the filtrate. A solids content of 50% was established by dilution with water.

The water glass solution was sprayed into a hot air spraying tower which was fitted with a disk atomizer, heated via a gas-fired combustion chamber and connected to a pneumatically dedusting tube filter for separating off the product, the combustion chamber being adjusted so that the hot gas entering the top of the tower had a temperature of 260° C. The amount of water glass solution to be sprayed was adjusted so that the temperature of the silicate/gas mixture leaving the spray tower was 105° C. The residence time was calculated as 16 seconds from the volume of the spray tower and the gas throughput through the spray tower. The amorphous sodium disilicate separated off on the tube filter had a bulk density of 480 g/l, an iron content of 0.01% by weight, an $SiO_2$ : $Na_2O$ ratio of 2.04 : 1 and a loss on ignition at 700° C. of 19.4%; its average particle diameter was 52 μm.

The amorphous sodium disilicate was introduced into a directly fired rotary tubular oven (length: 5 m; diameter: 78 cm; inclination: 1.2°) at its end opposite the flame, while the crystalline product was discharged on the flame side. This rotary tubular oven was insulated with several layers of mineral wool and a sheet metal jacket such that at a temperature inside the rotary tubular oven of 730° C., a temperature of not more than 54° C. occurred on its outer skin. 60 kg of the amorphous sodium disilicate per hour were introduced into this rotary tubular oven. The crystalline sodium disilicate ($Na_2Si_2O_5$ having a laminated structure), which had a water content (determined as the loss on ignition at 700°

C.) of 0.1% by weight, leaving the rotary tubular oven was comminuted to a particle size of less than 6 mm with the aid of a mechanical breaker, and after intermediate cooling was ground to an average particle diameter of 110 μm on a disk mill (diameter: 30 cm) at 400 min.:, the iron content of the ground product remaining identical to that of the amorphous sodium disilicate.

The waste gas from the rotary tubular oven was suctioned off in the intake region for the amorphous sodium silicate and purified with the aid of a cloth filter. 5 kg of sodium disilicate per hour, which consisted of hollow spheres (bulk density: 30 g/l; up to 3 mm diameter), were discharged from the filter and recycled to the rotary tubular oven intake.

The lime-binding capacity of the crystalline sodium disilicate at pH 10.4 and 20° C. was 82 mg of Ca/g.

EXAMPLE 2 (According to the Invention)

The amorphous sodium disilicate prepared according to Example 1 in the hot air spraying tower and having a bulk density of 480 g/l was ground with the aid of a high-speed hammer mill, a product having an average diameter $d_{50}$ 22 μm and a bulk density of 650 g/l resulting.

If the amorphous sodium disilicate obtained in the hot air spraying tower is compared under the microscope before and after its grinding in the hammer mill, it can clearly be seen that the original hollow spheres have been crushed to fragments of spheres.

120 kg of the ground amorphous sodium disilicate per hour were introduced into the rotary tubular oven used in Example 1 and operated under the conditions described in that example, no agglutination at all developing on the internal wall of the rotary tubular oven.

2 kg of sodium disilicate having a bulk density of 250 g/l were obtained per hour on the cloth filter, with the aid of which the air suctioned off in the intake region for the amorphous sodium disilicate was dedusted, and was recycled to the rotary tubular oven intake.

The lime-binding capacity of the comminuted crystalline sodium disilicate discharged from the rotary tubular oven at pH 10.4 and 20° C. was 85 mg of Ca/g.

We claim:

1. In a process for the preparation of crystalline sodium silicates having a laminated structure, a molar ratio of $SiO_2$ to $Na_2O$ of (1.9 to 2.1) : 1 and a water convent of less than 0.3% by weight by reacting sand with sodium hydroxide solution in a molar ratio of $SiO_2$: $Na_2O$ of (2.0 to 2.3): 1 to obtain a water glass solution having a solids content of at least 20% by weight; forming a pulverulent, amorphous sodium silicate having a water content (determined as the loss on ignition at 700° C.) of 15 to 23% by weight by spray drying the water glass solution with hot air of 200° to 300° C.; introducing the pulverulent, amorphous, water-containing sodium silicate into an inclined rotary tubular oven and treating it therein in countercurrent with flue gas at temperatures of more than 500° to 850° C. to form crystalline sodium silicate; comminuting the crystalline sodium silicate issuing from the rotary tubular oven to particle sizes of 0.1 to 12 mm and subsequently grinding it to particle sizes of 2 to 400 μm, the improvement according to which the spray-dried, pulverulent, amorphous, water-containing sodium silicate is ground to a product having an average diameter $d_{50}$ of 1 to 22 μm prior to introducing it into the inclined rotary tubular oven.

* * * * *